US011958192B2

(12) United States Patent
Khajepour et al.

(10) Patent No.: US 11,958,192 B2
(45) Date of Patent: Apr. 16, 2024

(54) METHOD AND SYSTEM FOR MOBILE RECONFIGURABLE ROBOT FOR A LARGE WORKSPACE

(71) Applicants: Amir Khajepour, Waterloo (CA); Hamed Jamshidifar, Waterloo (CA)

(72) Inventors: Amir Khajepour, Waterloo (CA); Hamed Jamshidifar, Waterloo (CA)

( * ) Notice: Subject to any disclaimer, the term of this patent is extended or adjusted under 35 U.S.C. 154(b) by 0 days.

(21) Appl. No.: 17/613,470

(22) PCT Filed: Jun. 1, 2020

(86) PCT No.: PCT/CA2020/050750
§ 371 (c)(1),
(2) Date: Nov. 22, 2021

(87) PCT Pub. No.: WO2020/237397
PCT Pub. Date: Dec. 3, 2020

(65) Prior Publication Data
US 2022/0219319 A1 Jul. 14, 2022

Related U.S. Application Data

(60) Provisional application No. 62/855,025, filed on May 31, 2019.

(51) Int. Cl.
*B25J 9/16* (2006.01)
*B25J 9/00* (2006.01)

(52) U.S. Cl.
CPC .......... *B25J 9/1617* (2013.01); *B25J 9/0009* (2013.01); *B25J 9/0051* (2013.01); *B25J 9/1607* (2013.01); *B25J 9/1692* (2013.01)

(58) Field of Classification Search
CPC . B25J 5/06; B25J 9/0009; B25J 9/0051; B25J 9/1607; B25J 9/1617; B25J 9/1692
See application file for complete search history.

(56) References Cited

U.S. PATENT DOCUMENTS

| | | | |
|---|---|---|---|
| 4,265,326 A * | 5/1981 | Lauber | E02F 9/04 180/8.3 |
| 4,558,758 A * | 12/1985 | Littman | B66F 11/046 182/2.11 |
| 5,219,410 A * | 6/1993 | Garrec | B62D 57/02 180/8.1 |

(Continued)

FOREIGN PATENT DOCUMENTS

| | | |
|---|---|---|
| CH | 672089 A5 | 10/1989 |
| CN | 108421668 A | 8/2018 |

(Continued)

OTHER PUBLICATIONS

International Search Report for International Application PCT/CA2020/050750 dated Aug. 11, 2020.

*Primary Examiner* — Dale Moyer
(74) *Attorney, Agent, or Firm* — Gowling WLG (Canada) LLP

(57) ABSTRACT

A method and system for a mobile configurable robot for use in a large workspace including a set of base fixtures located around a perimeter of the large workspace and a moving platform. Each base fixture and the moving platform is connected via a two-arm boom system whereby the two-arm boom system is controlled by a set of actuators.

18 Claims, 21 Drawing Sheets

(56) References Cited

U.S. PATENT DOCUMENTS

| | | | |
|---|---|---|---|
| 2015/0101871 A1* | 4/2015 | Riskas | F15B 21/085 |
| | | | 60/431 |
| 2018/0052466 A1* | 2/2018 | Wu | G05D 1/0231 |
| 2020/0009931 A1* | 1/2020 | Zona | B25J 9/0087 |
| 2020/0180168 A1* | 6/2020 | Han | B25J 9/1628 |
| 2020/0208359 A1* | 7/2020 | Zhao | B62D 55/062 |
| 2020/0216125 A1* | 7/2020 | Dou | H02S 10/12 |

FOREIGN PATENT DOCUMENTS

| | | |
|---|---|---|
| DE | 102013213609 A1 | 1/2015 |
| GB | 8929124 | 4/1990 |
| JP | 2006142481 A | 6/2006 |
| RU | 144273 U1 | 8/2014 |
| WO | 2004004986 A2 | 1/2004 |

* cited by examiner

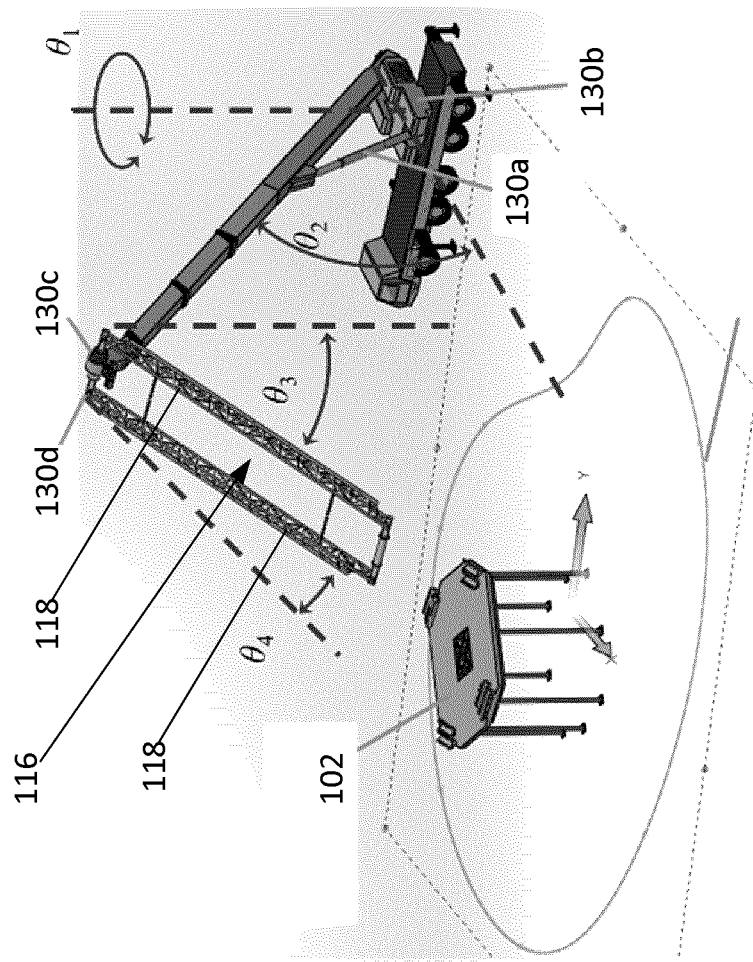
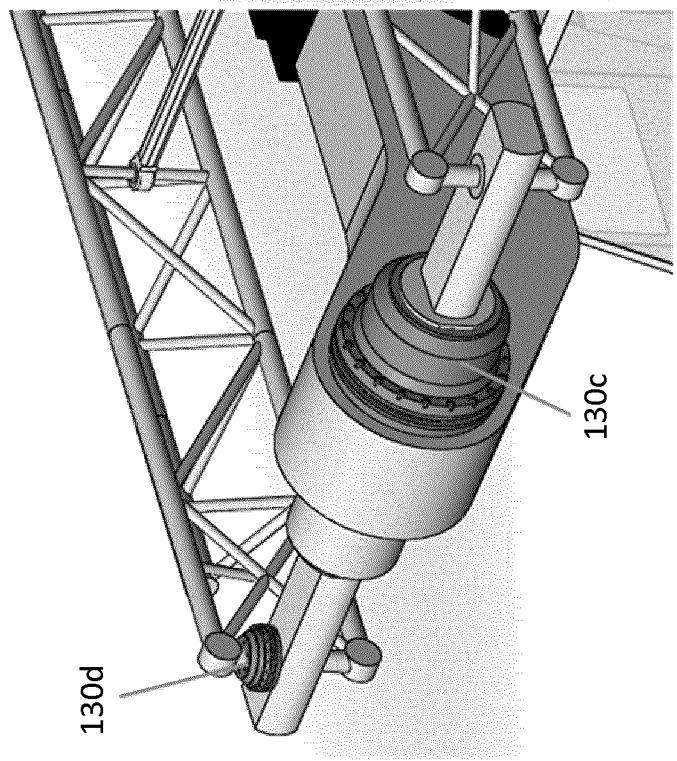
Figure 2a
Figure 2b

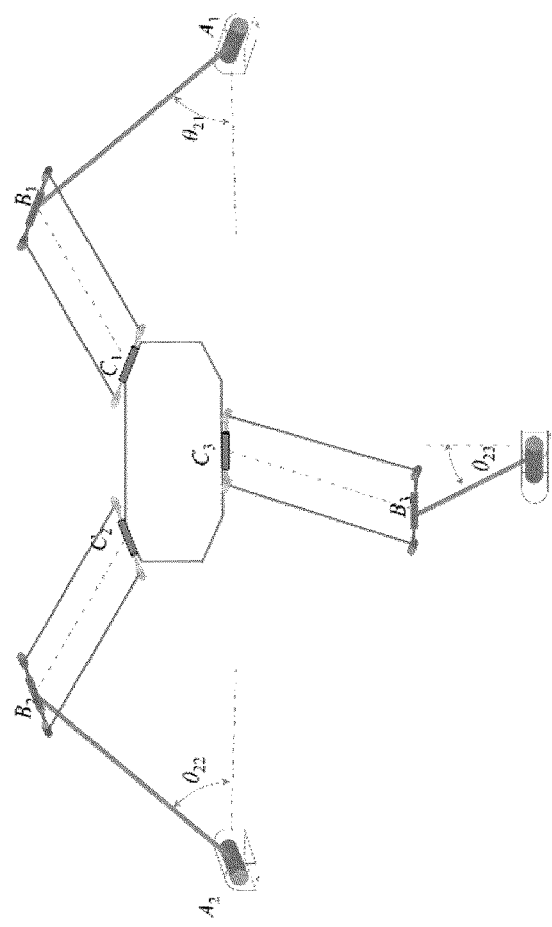
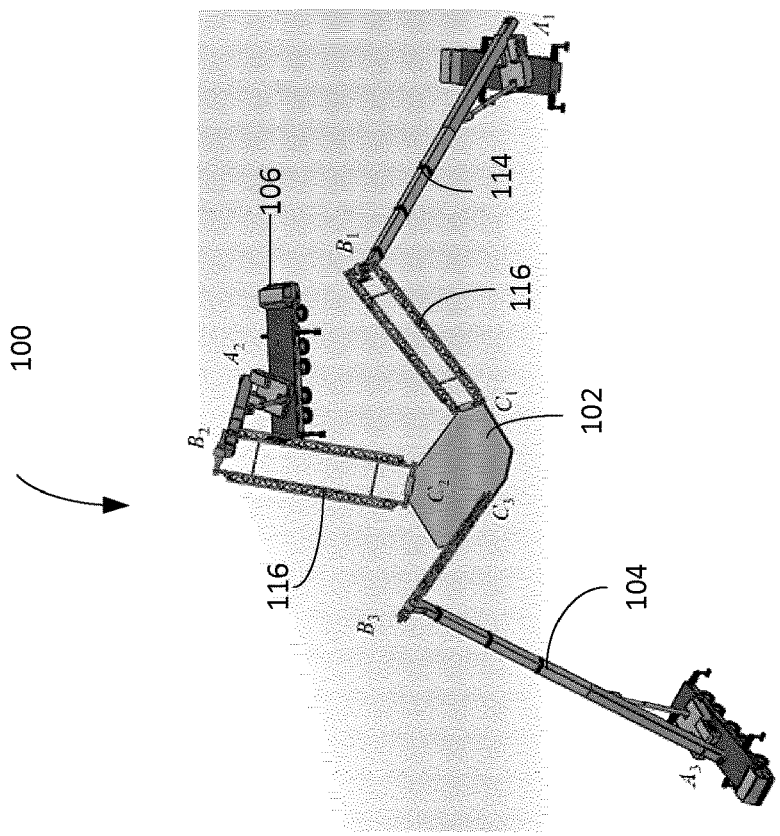
Figure 8a
Figure 8b

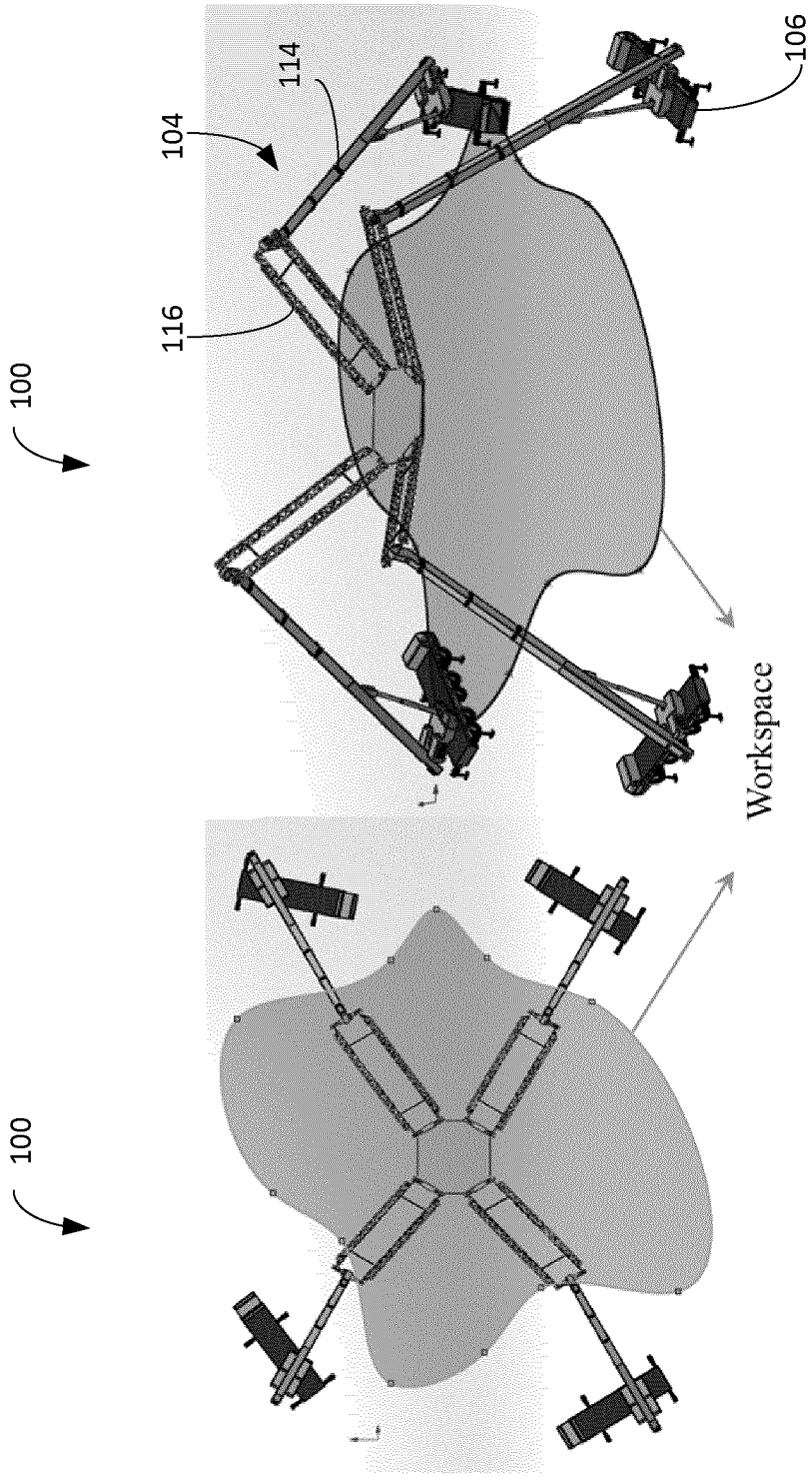

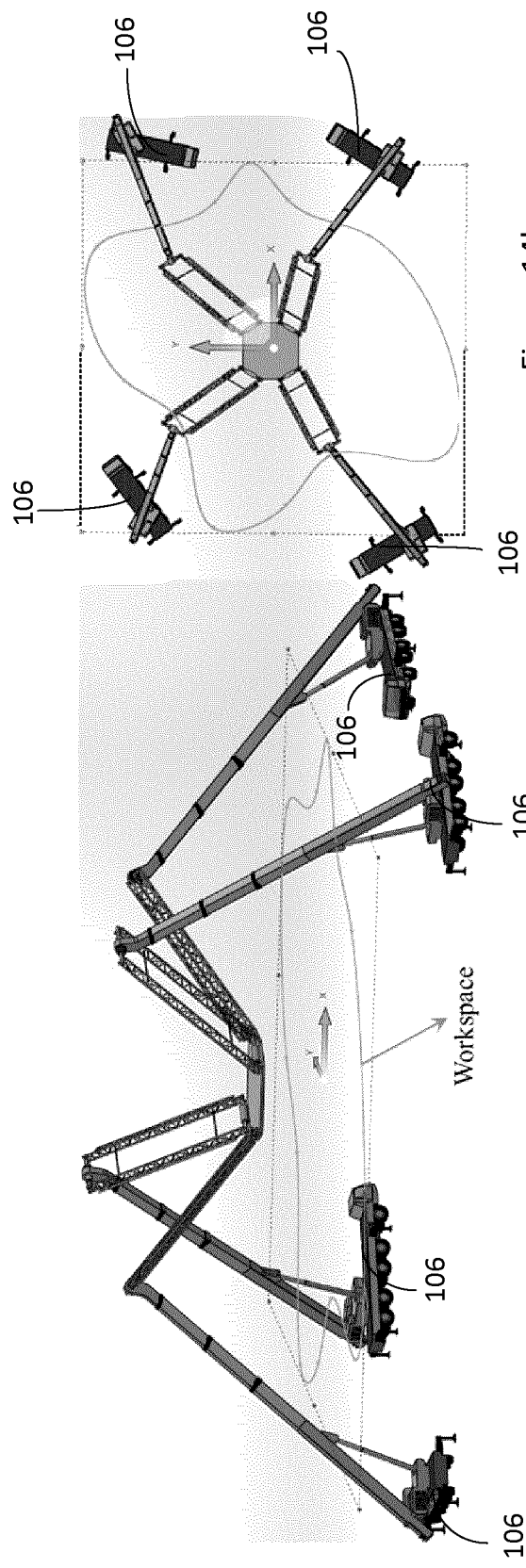

METHOD AND SYSTEM FOR MOBILE RECONFIGURABLE ROBOT FOR A LARGE WORKSPACE

CROSS-REFERENCE TO OTHER APPLICATIONS

This disclosure claims priority from U.S. Provisional Application No. 62/855,025 filed May 31, 2019, the contents of which are hereby incorporated by reference.

FIELD

The current disclosure is generally directed at robotic systems and, more specifically, at a method and system for a mobile reconfigurable robot for a large workspace.

BACKGROUND

In the field of construction and construction printing, operation within large workspaces typically requires the building of support structures to assist in supporting robotic systems being used in these large workspaces. Other examples of large workspaces may include, but are not limited to, agriculture, horticulture, and water treatment plants. The support structures are typically mounted or installed on flat areas of land surrounding the large workspace. For large workspaces that are located within areas of uneven terrain, the installation of these support structures will be more time-consuming.

After the job is completed, the un-installation of these support structures is also time-consuming. After taking the time to un-install the support structures, they are then typically placed atop a truck to move them to next site.

Therefore, there is provided a novel method and system for a reconfigurable robotic system for a large workspace.

SUMMARY

The disclosure is directed at a portable/movable robotic system for use in a large workspace. The system includes a moving platform that can operate with at least three (3) degrees of freedom (X, Y, Z) over the large workspace. In one embodiment, the disclosure is directed at a method and system that reduces or eliminates the need for any land preparation for the mounting or installation of the robotic system The robotic system may be used in a wide range of applications including, but not limited to, construction automation, construction printing, material handling, land preparation, agriculture, etc. In one embodiment, the system of the disclosure can handle large payloads to conduct operations in any location within the large workspace.

In one embodiment, the system and method of the disclosure includes at least three base fixtures for ease of at least one of mobility, reconfigurability or cost reduction. In one embodiment, the base fixture may be a vehicle, while in another embodiment, the base fixture may be a pillar or a portable stand. Mounted to the base fixture is a two-arm system for connecting the base fixture to a moving platform. The two-arm system includes a pair of arms, seen as a parallelogram arm, or parallelogram arm portion and a main arm, or main arm portion. Each of the parallelogram arm and the main arm can be fixed length or telescopic.

In one embodiment, the main arm is telescopic while the parallelogram arm has a fixed length and the base fixtures are vehicles. The main arm, similar to a crane boom, can extend and be placed in any angular orientation. When the robotic system, or robot, is deployed, the vehicles are placed in locations adjacent the large workspace in the available surrounding area. The main arm attached to each base fixture is then extended and oriented roughly based on the location of the moving platform or a predefined estimation. In one embodiment, the parallelogram arm portion is guided using built-in electric or hydraulic actuators to be attached to the moving platform to establish a parallel robot. For each desired large workspace and surrounding area, the position of the base fixtures and the length of the main arm portions are determined or calculated to provide a high, or maximum, stiffness to the moving platform over the large workspace.

In one embodiment, the robotic system of the disclosure is portable and reconfigurable which makes it adaptable to different workspace shapes and dimensions. An advantage of at least one embodiment of the system and method of the disclosure is that operational time and cost is reduced for many applications that require temporary use of large-workspace robots or robotic systems such as the ones discussed above.

In another embodiment, the system and method of the disclosure determines a location of each base fixture, such as a vehicle, for any given workspace and available surrounding areas to increase, or maximize, robot stiffness and accuracy.

In one aspect of the disclosure, there is provided mobile reconfigurable robot for use in a large workspace including a mobile platform; a set of base fixtures; and a set of two-arm booms, each of the set of two-arm booms mounted at one end to one of the set of base fixtures and at a second end to the mobile platform.

In another aspect, each of the set of two-arm booms includes a main arm portion; and a parallelogram arm portion. In a further aspect, the parallelogram arm portion includes a pair of arms portions in a parallel relationship with each other. In another aspect, each of the set of two-arm booms are connected to the mobile platform via a locking mechanism. In a further aspect, for each two-arm boom in the set of two-arm booms, the telescopic arm portion is connected to the parallelogram shaft portion via a revolute joint. In an aspect, each of the set of two-arm booms is connected to one of the set of base fixtures via a boom/fixture revolute joint. In another aspect, each two-arm boom in the set of two-arm booms further comprises a set of actuators. In yet a further aspect, the set of actuators includes a first actuator for controlling rotational movement of the boom with respect to the base fixture; a second actuator for controlling the boom/fixture revolute joint to determine a boom/fixture angle $\theta_2$, where the boom/fixture angle is an angle with respect to the telescopic arm portion and vehicle; a third actuator for controlling a parallelogram arm/telescopic arm boom angle $\theta_3$, where the parallelogram arm/telescopic arm boom angle is an angle with respect to the parallelogram arm portion and the telescopic arm portion of the boom; and a fourth actuator for controlling the platform/boom angle revolute joint to determine a platform/boom angle $\theta_4$, where the platform/boom angle is an angle with respect to the parallelogram arm portion and the telescopic arm portion of the boom.

In a further aspect, the base of fixtures includes a portable stand, a vehicle, a pillar or a stationary tower. In another further aspect, the system includes at least one controller for controlling the set of actuators. In yet a further aspect, the main arm portion includes a telescopic arm portion; and a fixed arm portion. In another aspect, the locking mechanism includes a split revolute joint mechanism. In a further aspect, the locking mechanism further includes an actuator for controlling the split revolute joint mechanism.

In another aspect of the disclosure, there is provided a method of providing a robotic apparatus for use in a large workspace including placing a set of base fixtures around a perimeter of the large workspace; connecting a first end of a two-arm boom to each of the set of base fixtures; and connecting a second end of the two-arm boom to a moving platform within the large workspace.

In a further aspect, connecting the second end of the two-arm boom to the moving platform includes determining a location of the moving platform within the large workspace; determining a location of each of the set of base fixtures; controlling a set of actuators associated with each two-arm boom based on the location of the moving platform and the location of each of the set of base fixtures. In yet another aspect, controlling the set of actuator includes controlling rotational movement of the two-arm boom with respect to the base fixture; controlling a boom/vehicle angle $\theta_2$, where the boom/vehicle angle is an angle with respect to a telescopic arm portion of the two-arm boom and the base fixture; controlling a parallelogram arm/telescopic arm boom angle $\theta_3$, where the parallelogram arm/telescopic arm boom angle is an angle with respect to a parallelogram arm portion of the two-arm boom and the telescopic arm portion; and controlling a platform/boom angle $\theta_4$, where the platform/boom angle is an angle with respect to the parallelogram arm portion and the telescopic arm portion of the boom.

In an aspect, the method further includes calibrating the robotic apparatus. In another aspect, the method further includes determining inverse kinematics of the robotic apparatus. In a further aspect, the method includes controlling a locking mechanism to lock the moving platform and the two-arm boom together.

DESCRIPTION OF THE FIGURES

Embodiments of the present disclosure will now be described, by way of example only, with reference to the attached Figures.

FIG. 2a is an enlarged view of a portion of a boom;

FIG. 2b is a perspective view of a single boom for use in the robotic system of FIG. 1;

FIG. 3a is another perspective view of a single boom;

FIG. 3b is a schematic view with the parameters of the boom of FIG. 3a;

FIG. 8a is a perspective view of a robotic system with three booms;

FIG. 8b is a schematic view with the parameters of the robotic system of FIG. 8a;

FIG. 9a is a top view of a robotic system with four booms with a large rectangular workspace;

FIG. 9b is a perspective view of the robotic system of FIG. 9a;

FIG. 10a is a top view of a robotic system with four booms with an irregularly shaped large workspace;

FIG. 10b is a perspective view of the robotic system of FIG. 10a;

FIG. 13a is a perspective view of a robotic system with three booms in an irregularly shaped large workspace with parameters;

FIG. 13b is a top view of the system of FIG. 13a;

FIG. 14a is a perspective view of a robotic system with four booms in an irregularly shaped large workspace with parameters;

FIG. 14b is a top view of the system of FIG. 14a;

DETAILED DISCLOSURE

The disclosure is directed at a method and system for a mobile reconfigurable system, or robot, for use in large workspace operations. The system includes a moving platform that is attached to one end of a set, or series, of booms (or two-arm systems) that control movement of the moving platform. The other end of each of the two-arm systems is attached to a base fixture, such as, but not limited to, a pillar, a portable stand or a vehicle, allowing the robotic system to be easily and quickly installed and uninstalled and then moved to a next location. In other words, the system of the disclosure is highly portable. When the base fixture is a vehicle, each vehicle includes a set of supports/legs/outriggers ("legs") that allow the vehicle to be stationary when the mobile reconfigurable system is in use. The legs further include an apparatus or system for levelling the individual vehicles such that it can be placed on any type of terrain (or uneven terrain).

In another embodiment, the two-arm system can be mounted to individual stationary towers. A height of the tower can be adjusted via the same mechanism used in crane towers allowing the system of the disclosure be used in applications for high rise building constructions and automation. In another embodiment, the system and method of the disclosure determines a location of the base fixture, such as a vehicle, for any given workspace and available surrounding areas to increase, or maximize, robot stiffness and accuracy.

In one embodiment, by moving the two-arm systems, the position of the moving platform can be controlled. In one embodiment, the robotic, or moving platform can be large enough to house or support other equipment for an intended application. For example, in construction and 3D building printing applications, the moving platform may carry concrete, a mixer, nozzles, or even other robots to perform the tasks needed. For material handling operations, a loader or gripper can be mounted to the moving platform to pick and place different items or pallets. The moving platform may also be used as a stable and rigid place for human operators to perform manual operations.

Figure 1:
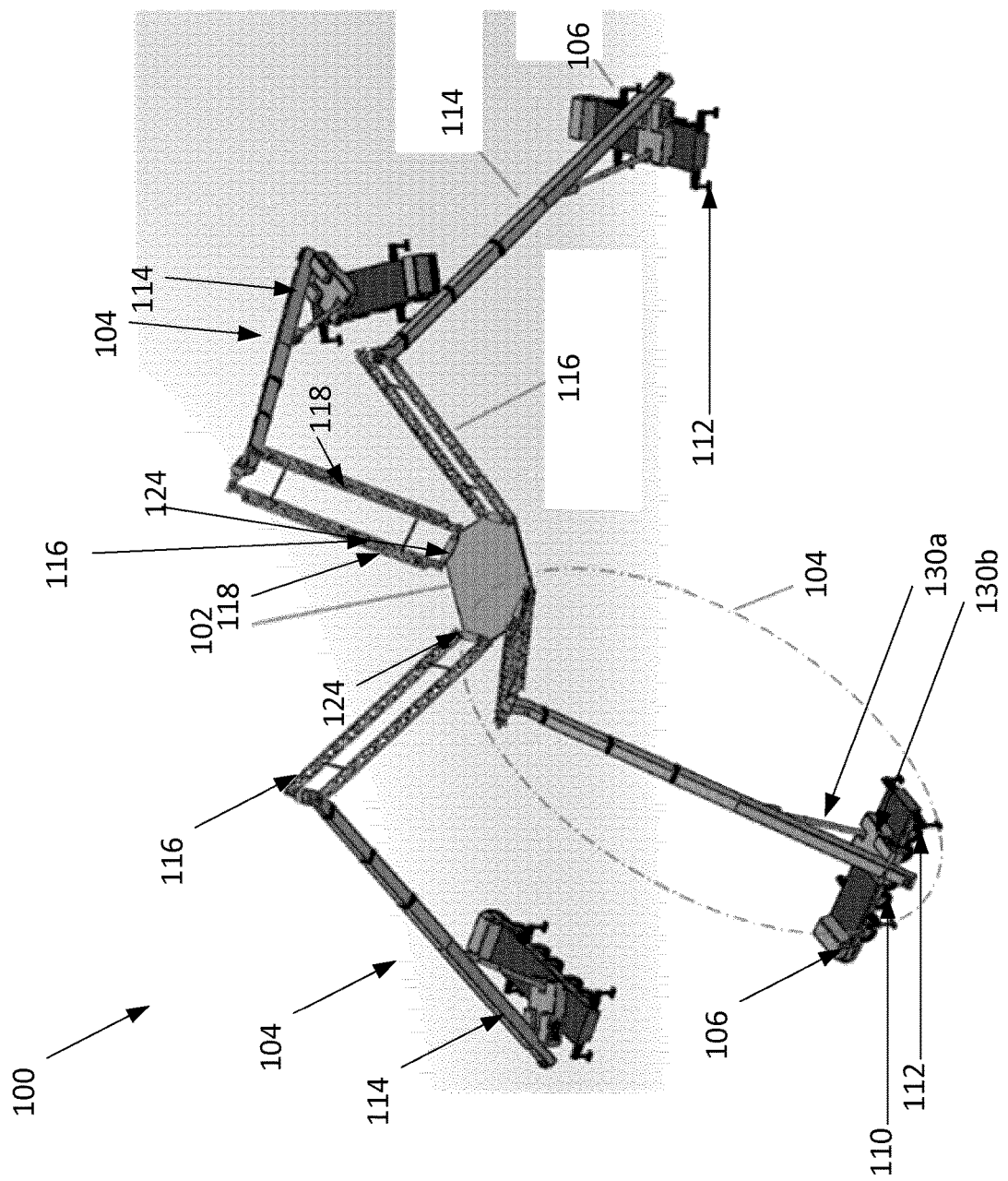
FIG. 1 is a perspective view of a robotic system for use in a large workspace.

Turning to FIG. 1, a schematic diagram of a system for a mobile reconfigurable robot, or robotic system, for use in large workspace operations is shown. A large workspace may be defined as a workspace for construction, agriculture, horticulture, and water treatment plants and the like. The system 100 includes a moving platform 102 that is connected to a set of, preferably, two-arm booms, or systems, 104. Each of the booms 104 is installed on, or attached to, a base fixture 106, such as a vehicle. In another embodiment, the base fixture may be a fixed pillar, a stationary tower or a portable stand.

In operation, the boom may have its orientation and preferably its length changed as needed. In one embodiment, to enable the boom to change its orientation and/or length, one method is to connect the boom, or two-arm system, through a revolute joint to a revolving arm. The orientation of the boom 104 may then be changed by controlling the angle between the revolving arm and boom 104 through an actuator, such as for example hydraulic cylinder 130b.

In the current embodiment, where the base fixture is a vehicle, each vehicle preferably includes a set of wheels 110 along with a set of legs 112 which allow the vehicle to be stationary when the system 100 is in use. Although not shown, the set of legs 112 include an apparatus for levelling the vehicle, such as when the vehicle is on uneven terrain. More specifically, the legs 112 reduce the likelihood or prevent the vehicle from moving or tipping while the platform 102 is moving or the system 100 is in use. The set of legs 112 are preferably configurable (via the apparatus for levelling the vehicle) such that the system can be situated on different terrains and uneven ground.

Figures 3A, 3B:
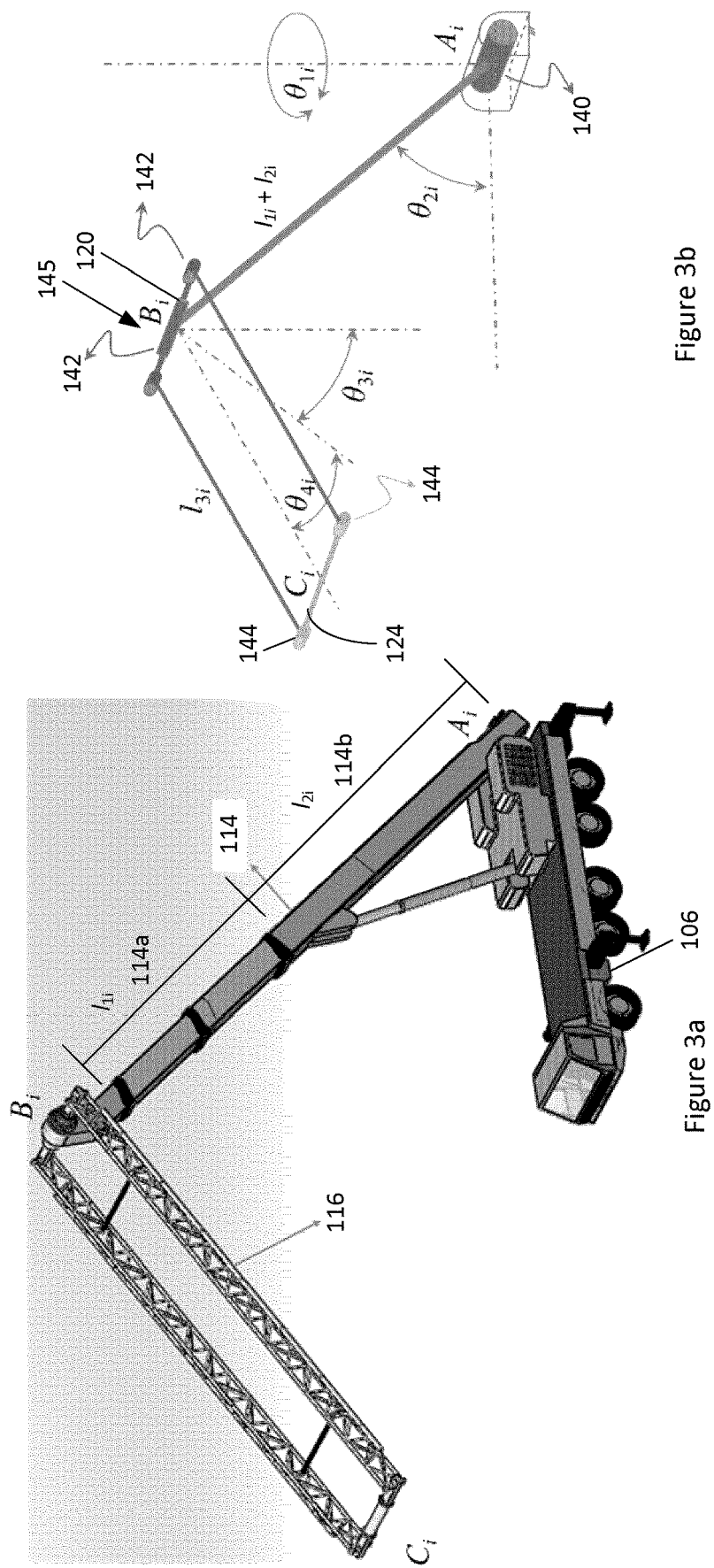

Each boom 104, which in the current embodiment is a two-arm boom, includes a first, telescopic arm or main boom, portion 114 and a second, or parallelogram arm, portion 116. It is understood that both arm portions may be telescopic or both arm portions may be fixed length. The telescopic arm portion 114 may be seen as being similar to a crane arm. The parallelogram arm portion 116 is in the shape of a parallelogram having a first pair of parallel arms 118. Turning to FIG. 3b, the telescopic arm portion 114 and one end of the parallelogram arm portion 116 are connected to each other via a revolute joint with the parallelogram arm connector shaft portion 120. The parallelogram arms 118 are connected to the parallelogram arm connector shaft portion 120 from both ends via revolute joints 142 with parallel axes normal to the axis of shaft portion 120. The other ends of the parallelogram arms 118 are connected to shaft portion 124 via revolute joints 144 with axes parallel to joint 142. The parallelogram arm connector shaft 124 is connected to the moving platform 102 as will be described in more detail below.

Although a set of four (4) booms 104 are shown in FIG. 1, the system 100 may include at least three (3) booms for controlling three translational motions of the platform. The more booms in the set of booms 104 connected to the moving platform 102 provide a more rigid and larger workspace and provides for a pure translational motion to the moving platform 102. Additional booms can also be envisioned to provide extra degrees of motion via different mechanism design. The translational motion of the platform 102 can be controlled by different methodologies, such as, but not limited to, adjusting the horizontal and vertical angles of boom 104 (angles $\theta_1$ and $\theta_2$ in FIG. 2b), by controlling the length of the booms 104, or controlling a combination of the angles and the lengths. In operation, at least three of these adjustments are needed to control 3 degrees of motion of the robotic, or moving platform. Different combinations of these adjustments can be used to increase rigidity, reachability, or force distribution in the robotic system. When more than three adjustments are used at a time, three of them are independent and the remaining are dependent.

Turning to FIGS. 2a and 2b, further views of a single boom are shown. FIGS. 2a and 2b provide an overview of the articulations of the boom along with actuators that enable these articulations. In many current on-site large workspace operation systems, the system requires land-fixed points for installation of their system. In one embodiment of the system of the disclosure, the booms 104 are mounted to portable, or mobile, vehicles 106 that can be easily, and quickly, moved. Use of these vehicles 106 enables the robotic system 100 to be installed and uninstalled in different locations in a short time as there is less disassembly and reassembly time.

As can be seen in FIGS. 2a and 2b, the two-arm boom 104 includes a set of, which in the current embodiment is four (4), hydraulic actuators 130. The set of actuators 130 include one linear actuator 130a and three rotational actuators 130b to 103d that are used to adjust the angles $\theta_1$ to $\theta_4$. The set of actuators may include another actuator (not shown) in the telescopic arm portion 114 to adjust the length of the arm portion 114. $\theta_1$ represents a rotational angle of the boom with respect to a vertical direction; $\theta_2$ represents a first boom angle with respect to the vehicle base or a horizontal plane; $\theta_3$ represents an angle between the plane of the parallelogram arm portion with respect to the vertical direction; and $\theta_4$ represents the angle of the parallelogram arm with respect to a vertical plane that includes arm 104. Accordingly, by adjusting $\theta_3$ and $\theta_4$, any desired orientation can be provided for the parallelogram arm portion 116 with respect to the telescopic arm portion 114.

Actuators 130a, 130b, 130c and 130d along with the telescopic actuator within telescopic arm portion 114 can be used for connecting the boom 104 to the moving platform 102. After such connection, actuators 130c and 130d are held in a passive mode (where each actuator is free to move and does not apply any active torque in such conditions) and the other actuators including the telescopic actuator within telescopic arm portion 114 can be used to move the platform 102 as discussed below.

When the system is assembled, there are different methods to control the moving platform 102. As seen in FIG. 2a, each boom 104 has 2 rotational controllable motions enabled via actuators 130a, 130b, and one sliding motion via the telescopic arm portion 114. As such, for the platform 102 in FIG. 1 and FIG. 8, there are 12 and 9 actuators, respectively, to manipulate the moving platform 102. The moving platform 102 has only three degrees of freedom (DOFs) and hence, there will be 9 and 6 degrees of redundancy for the platform 102 in FIG. 1 and FIG. 8, respectively. The redundancy of actuators can be used to improve or optimize different characteristics of the platform motion. For example, the redundancies can be used to increase or maximize the load capacity of the platform in vertical directions, or to increase or maximize the directional stiffness of the platform in a desired direction. Such improvement or optimizations provide a novel solution for the operation of the system.

Turning to FIGS. 3a and 3b, further views of the boom are shown. FIG. 3a is a perspective view of the boom 104 attached to the vehicle 106 while FIG. 3b is a schematic view showing an arrangement of the parameters of the boom. As will be understood, the angles $\theta_2$ to $\theta_4$ are the same as those in FIG. 2. The points $A_i$, $B_i$ and $C_i$ of FIG. 3a correspond with the points $B_i$ and $C_i$ of FIG. 3b and represent the central point of pivoting axes of the different revolute joints.

As shown in FIG. 3b, the telescopic arm portion 114 is preferably connected to the vehicle 106 via a resolute joint 140. The telescopic arm portion 114 may include a telescopic portion 114a and a fixed portion 114b. The telescopic portion 114a may be seen as having an extendable length, denoted as which is enabled via a telescopic slider mechanism (including the telescopic actuator) within the telescopic arm portion 114 while a length ($l_{2i}$) of the fixed portion 114b is fixed with its value or length selected based on the requirements of the boom 104 or system 100. In use, the telescopic portion 114a is used to adjust the workspace of the system 100 whereby a longer telescopic arm portion 114 enables a larger workspace.

The fixed portion 114b is connected to the base fixture, or vehicle, via the revolute joint 140 such that the telescopic arm portion 114 can pivot with respect to the vehicle 106. Although not shown in detail, in a preferred embodiment, the boom 104 can also rotate with respect to the vehicle 106 such as about angle or axis $\theta_1$.

Figure 4B:
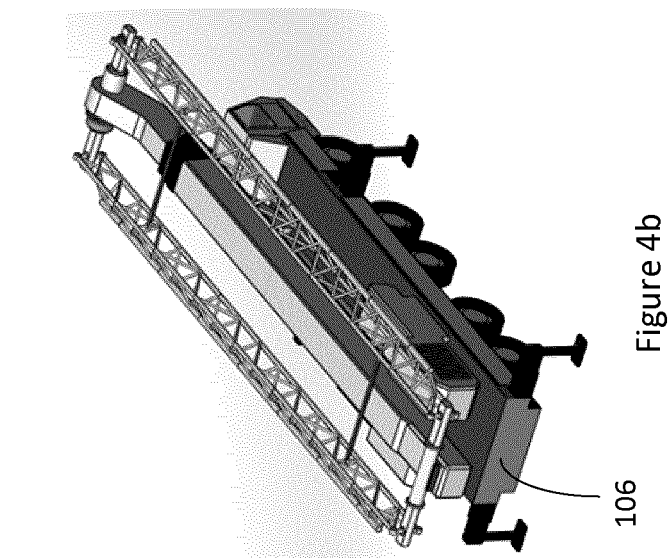
FIGS. 4a and 4b are perspective views of a single boom in a closed position.
Figure 4A:
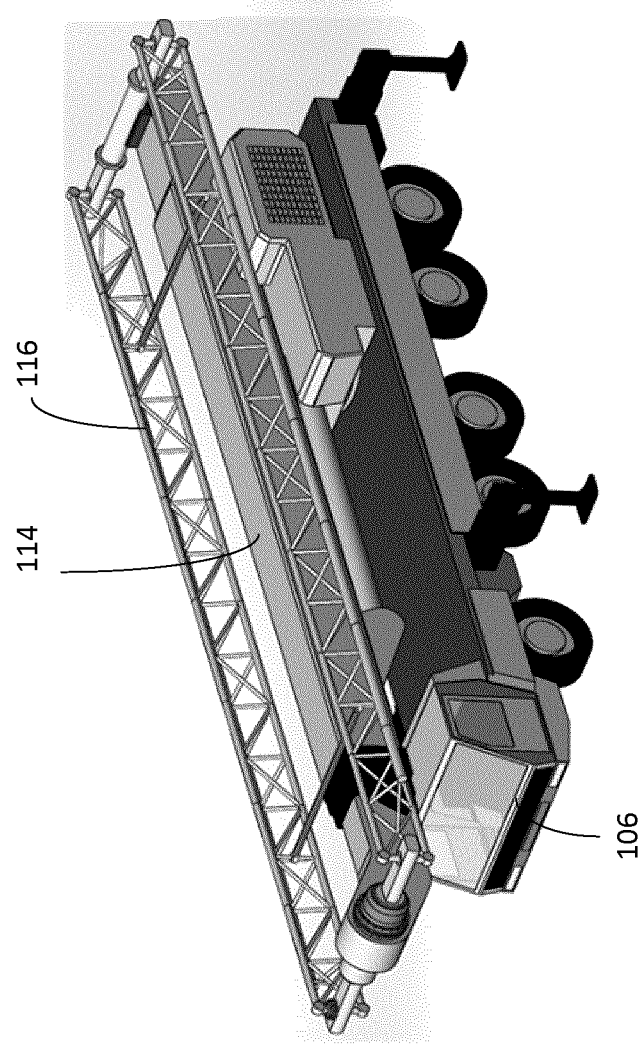

As shown in FIGS. 4a and 4b, a pair of perspective views showing a boom in a closed position are provided. Using the actuators of each boom, the boom 104 can be completely folded on top of the vehicle 106 which allows the system 100 to be quickly uninstalled (once the moving platform 102 and the booms 104 are detached from each other) so that the system 100 (or an individual boom 104 and vehicle 106 combination) can be moved to another workplace in a more accelerated manner. In this embodiment, the system may be seen as a mobile and/or portable robot system 100 for use in a large workspace operation of environment.

Figure 5:
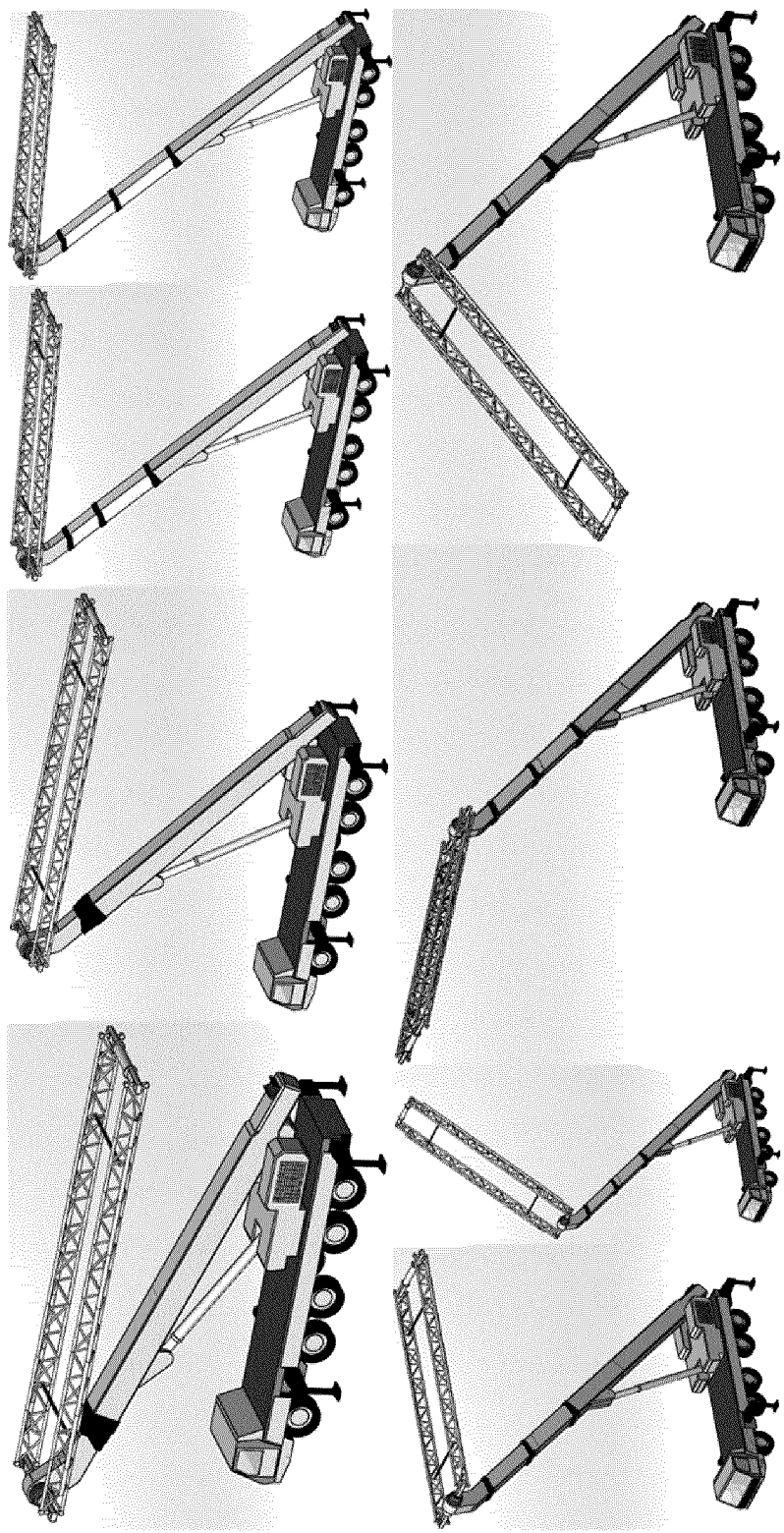
FIG. 5 is a series of views of a single boom moving from a partially closed position to an open position.

FIG. 5 provides a sequence of schematic drawings showing the boom being moved from a slightly open position to a fully open position. As will be understood, the movement and/or positioning of the boom 104 when being moved from the closed to the fully open position may follow a different trajectory than shown in FIG. 5, however the diagrams in FIG. 5 show one possible trajectory.

Figure 6:
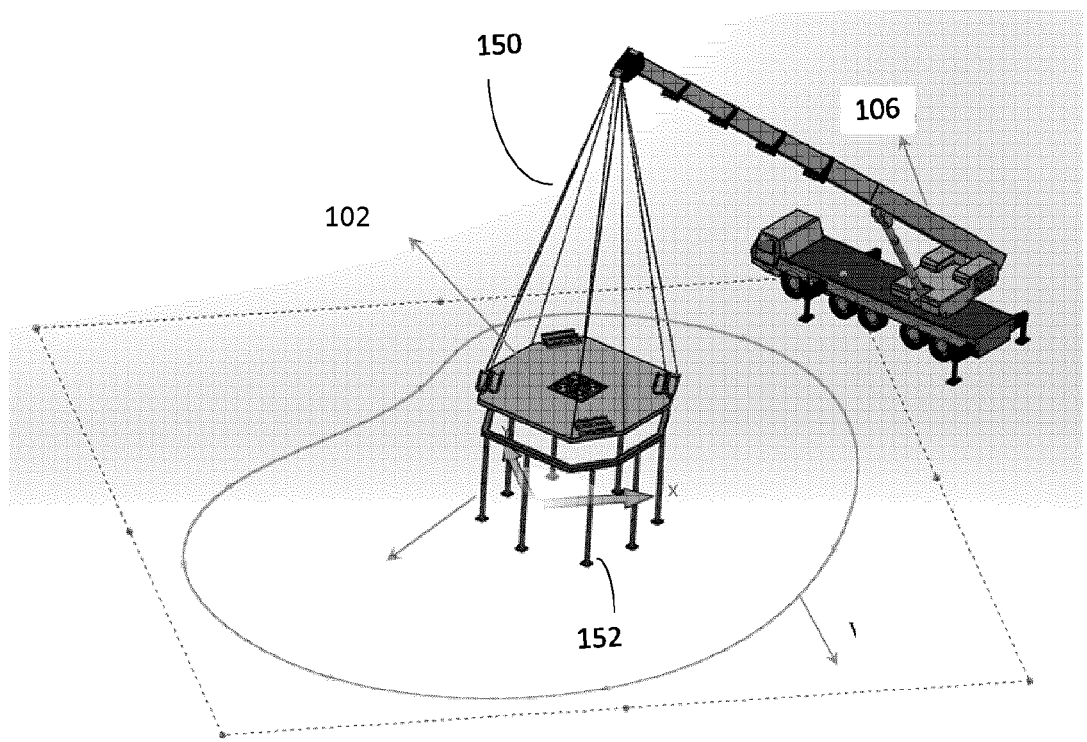
FIG. 6 is a perspective view of a moving platform being placed atop a platform fixture.
Figure 7:
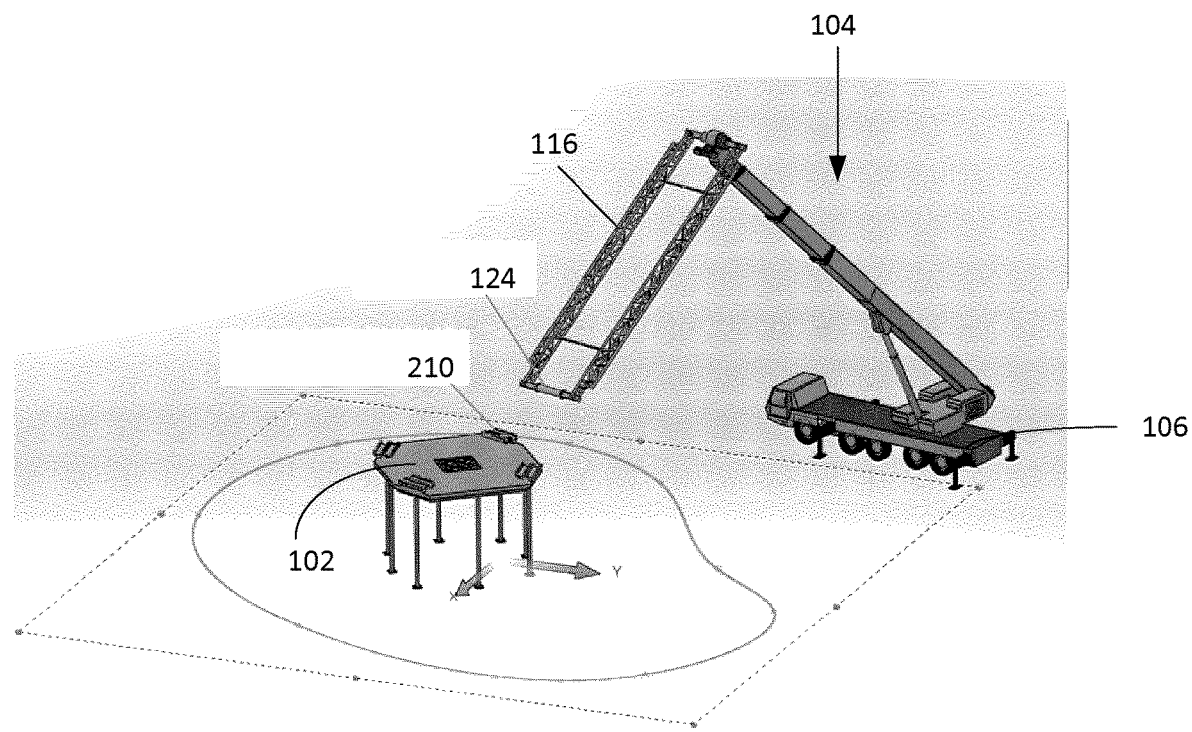
FIG. 7 is a perspective view of a boom connecting to the moving platform.

As illustrated in FIG. 6, in order to move the moving platform 102 from a first large workspace to a second large workspace, the platform 102 may be moved by a conventional crane. As can be seen in FIG. 6, the moving platform 102 may be supported by a platform fixture 152. Although shown as being two separate parts, the moving platform 102 and the platform fixture 152 may be a single integrated part and moved together. In another embodiment, a second platform fixture may be placed within the second workspace whereby only the moving platform needs to be moved and then placed atop the second platform fixture.

Turning to FIG. 8a, a schematic diagram of another embodiment of a system for a mobile reconfigurable robot platform is shown. In the current embodiment, the system includes three (3) booms 104 and corresponding base fixtures, seen as vehicles 106. FIG. 8b provides a schematic diagram of the system of FIG. 8a with parameters.

By having at least three robotic booms 104 connected to the moving platform 102, a parallel robot with pure translational motion is formed where by changing the angle ($\theta_{2i}$) of the telescopic arm portion 114 of each of the booms 104 while keeping the length of telescopic arm portions 114 fixed, or by changing the length of the telescopic portion 114a while keeping the angle ($\theta_{2i}$) of the telescopic arm portion 114 fixed, or by a combination of angle ($\theta_{2i}$) and length of arm portion 114, whereby the moving platform 102 can be controlled as schematically shown in FIG. 8b. The relation between the position of the moving platform 102 and the angle ($\theta_{2i}$) of the booms is discussed in more detail below.

In one embodiment of the system 100, by using portable vehicles 106, the configuration of the system (and the location of the booms 104) can be changed to adapt the system to different large workspaces including different terrains, uneven ground levels, obstacles and the like. Accordingly, regarding the shape and size of the workspace and the space around such workspace, a preferred or optimal position of each vehicle can be determined.

In one embodiment, a number of vehicles needed to cover the large workspace can be determined. As discussed above, the system requires at least three (3) vehicles. The location (s) adjacent the workspace where the vehicles are placed is also determined by generating an XY coordinate system with respect to the workspace and then determining where in the XY coordinate system the vehicles 106 should be located that enables the moving platform to traverse the entire workspace.

Figures 9A, 9B:
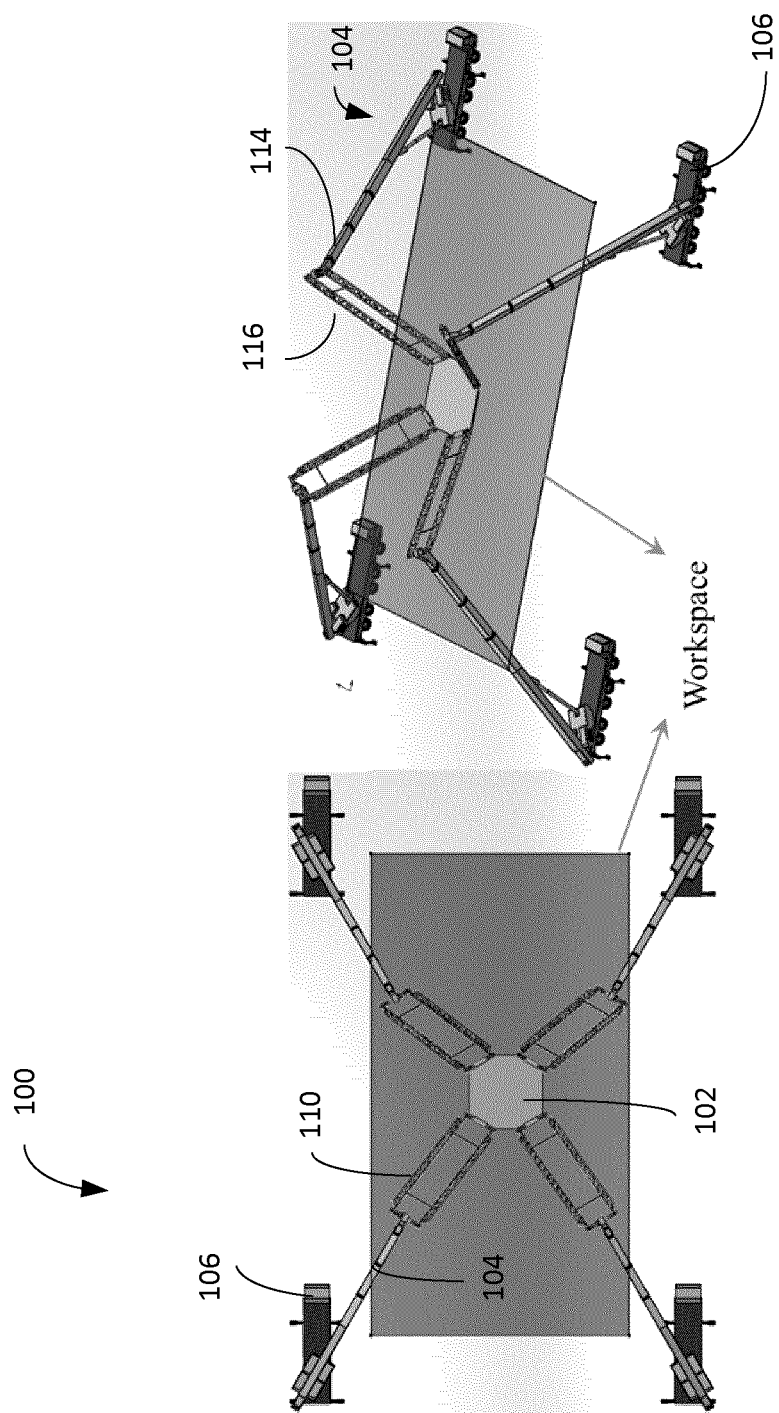

For example, consider the arrangement of four vehicles, such as shown in FIGS. 9a (top view) and 9b (perspective view) where a workspace with a rectangular footprint is covered by a four-boom robotic system. As shown, to cover the workspace of FIGS. 9a and 9b, the arrangement of the vehicles is selected to be symmetrical. For the irregularly shaped workspace with a footprint of FIGS. 10a (top view) and 10b (perspective view), the arrangement of the location of the vehicles is selected to be asymmetric to be able to cover the irregularly shaped large workspace.

Figure 11B:
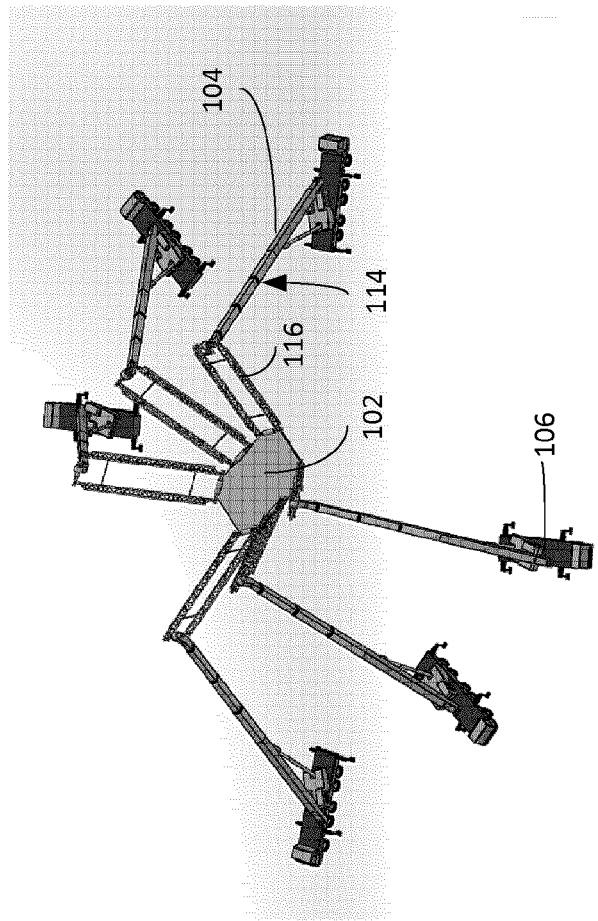
FIG. 11b is a perspective view of a robotic system with six booms.
Figure 11A:
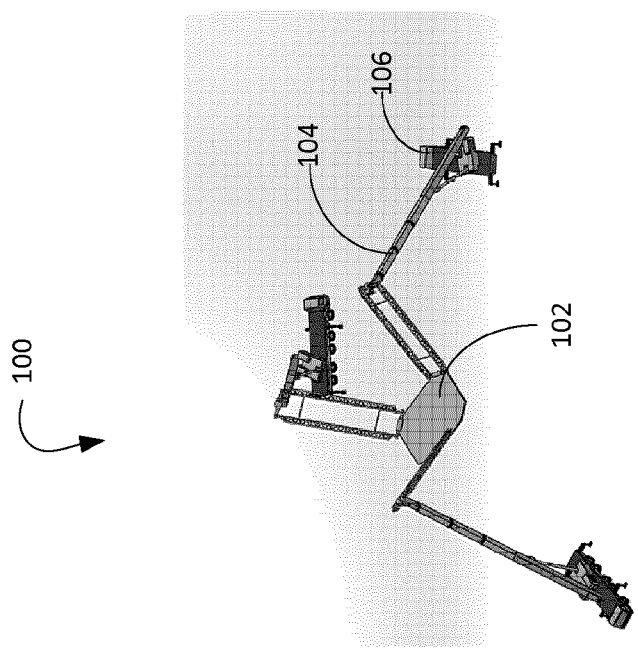
FIG. 11a is a perspective view of a robotic system with three booms.

As discussed above, the system 100 may include any number of booms such as three (FIG. 11a) or six (FIG. 11b). The arrangement of the vehicles 106, the number of vehicles 106 or robotic arms/booms is based on the parameters of the workspace and requirements or resources of the user. Such variation in the number of booms and vehicles helps to cover different workspaces and provides different force capabilities for the system at different points of its workspace.

Another advantage of the current system is that the system may be deployed on an uneven terrain and does not require any foundation or surface terrain preparation. In many current systems (that do not provide the mobility and/or portability of the current system), the supports to the moving platform are seen more as permanent fixtures and are not readily or quickly mobile once a project is complete (as with the boom and vehicle embodiment in the current disclosure). Foundation preparation, including levelling the terrain, and installation of different components is one of the most time-consuming tasks for current robotic systems. As discussed above, an advantage of the system of the disclosure is that it does not need any foundation or surface preparation to be operational. Compared to other robotic systems, this advantage can save a lot of time. Furthermore, the system of the disclosure may operate in any workplace with uneven terrain. Instead of levelling the surface, each vehicle, or base fixture, 106 includes a self-levelling mechanism.

As discussed above, each vehicle includes a set of outriggers that can be used to easily and quickly install and then uninstall the robotic system. Accordingly, by levelling all vehicles through the self-levelling mechanism, the robotic system may be levelled and the position and orientation of each boom can be found based on a measurement system.

Figure 12:
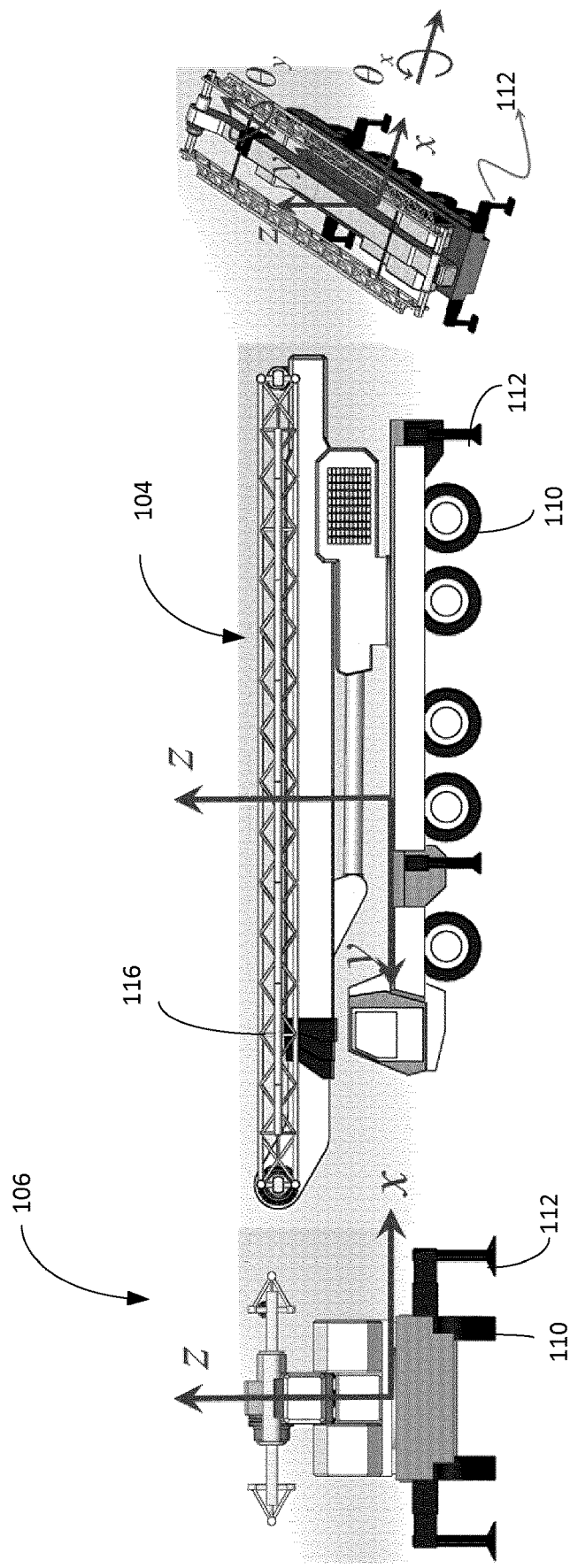
FIG. 12 is a series of views of a vehicle for use in a robotic system.

As illustrated in FIG. 12, in order to level each vehicle, each vehicle is equipped with a set of, preferably four, outriggers 112 where a height of each outrigger can be adjusted and locked independently according to the terrain. By adjusting the height of each outrigger, the angle of the vehicle around x and y axis, denoted by $\theta_x$ and $\theta_y$, can be adjusted to fully level the vehicle. When the vehicle is levelled, the outriggers, are locked to hold the vehicle in such orientation to provide a level foundation for its respective boom.

Figures 13A, 13B:
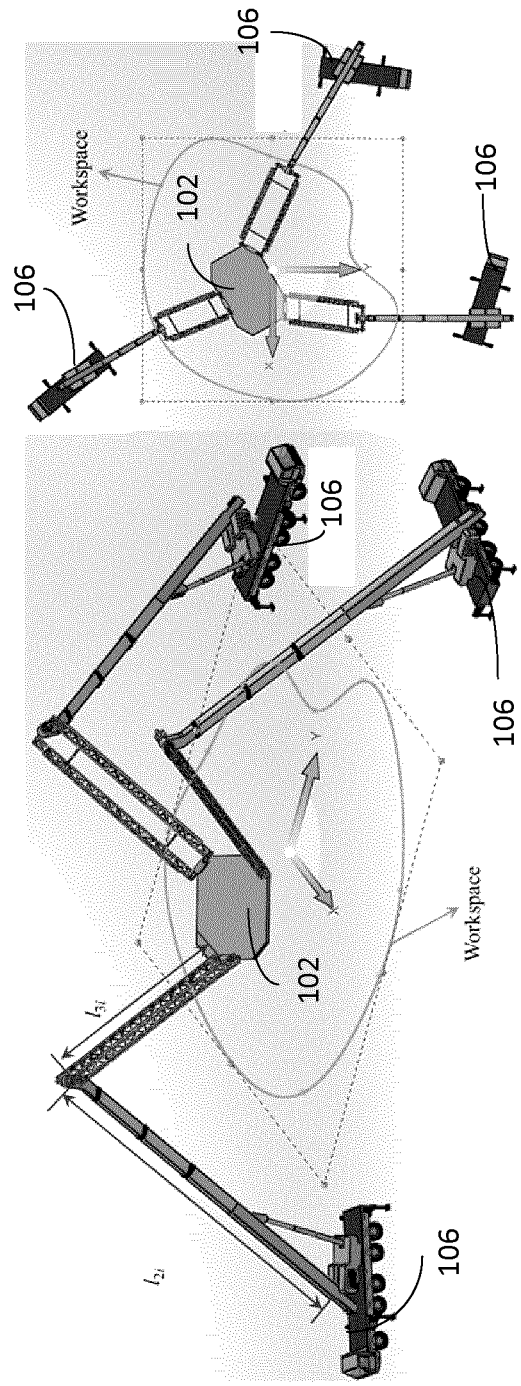

In order to cover a given workspace with a specific shape, as shown in FIGS. 13a and 13b, multiple options for the locations of the vehicles and also different lengths for the arms of boom i, denoted by $l_{2i}$ and $l_{3i}$, can be selected. For simplicity purposes, the subscripts are selected by selecting one vehicle to be number 1 and then going either clockwise or counter-clockwise for the remaining numbers. A schematic diagram of a system with four vehicles is shown in FIG. 14.

As discussed above, at least three booms/vehicles are needed for this robotic system to work. More booms/vehicles may also be used for larger workspaces, or a tighter vehicle footprint for a given workspace, or a higher payload and stiffness. This will be dependent on the application and dimensions and load capacity of the booms.

Based on the inverse kinematics of the parallel robot of the system, the translational position of the moving platform 102 is controlled by adjusting the angles $\theta_{1i}$ and $\theta_{2i}$ of the telescopic arm portion 114 of the booms 104 or the lengths of the telescopic arms, or a combination or both. Accordingly, in systems with more than three booms, three of the booms are under position control and seen as master booms while the other booms, which are following the motion of the moving platform, are seen as slave booms. In this embodiment of control strategy, the slave booms follow a predefined motion based on the motion of the master booms. In such situations, to reduce the likelihood or to prevent large interaction forces/moments between the moving platform 102 and the slave booms due to any error in their motion, an additional compliance may be added to the actuators of the slave booms. Such additional compliance can be applied in different ways. For example, the compliance can be added to a hydraulic actuation circuit of a slave boom.

Figure 15:
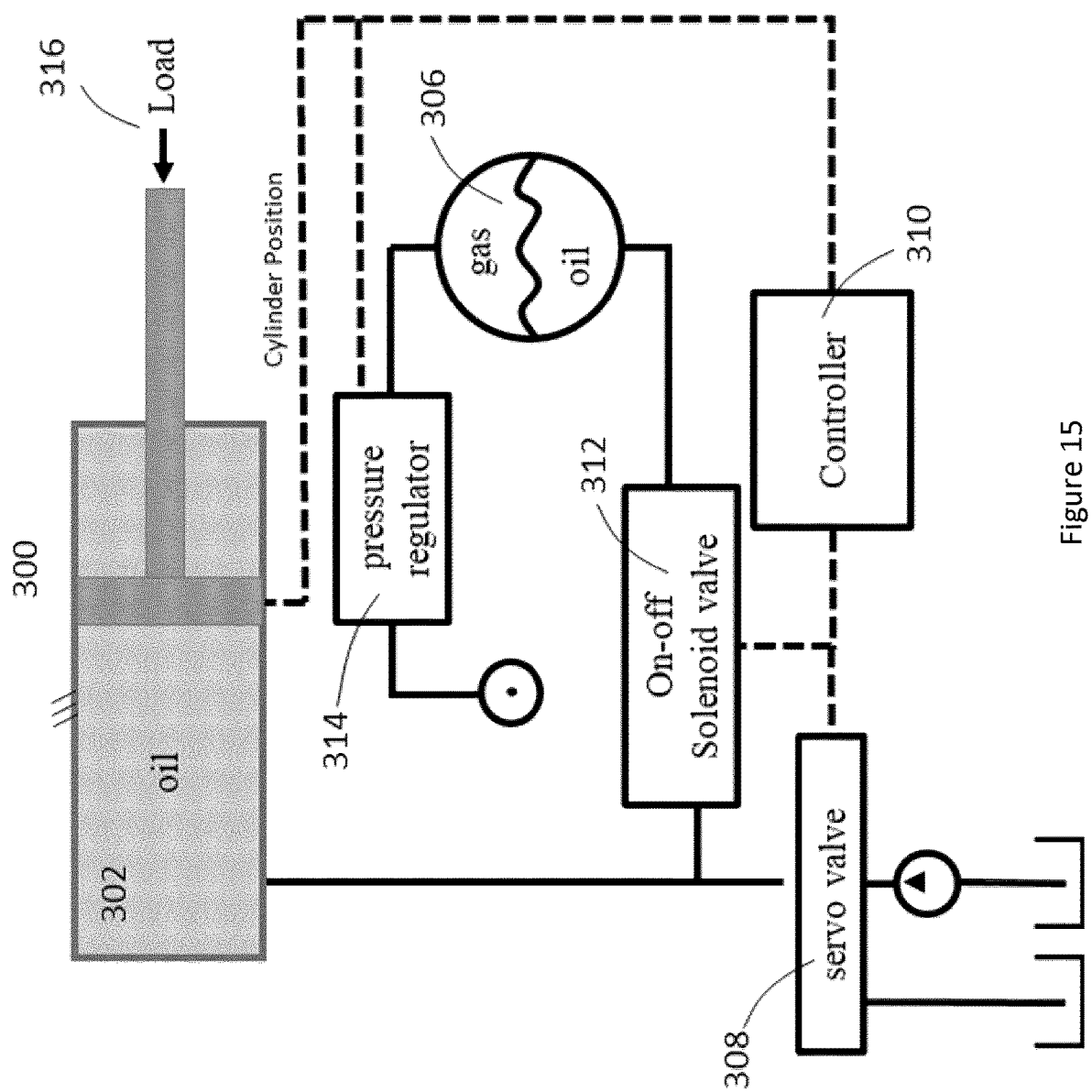
FIG. 15 is a schematic diagram of a compliance circuit.

Turning to FIG. 15, one embodiment of a circuit of a hydraulic jack 300 that is used to control the angle of the telescopic arm portion 114 in each boom to provide compliance is shown. Cylinder 302 is connected to servo valve 308 and hydraulic accumulator 306 through solenoid on-off valve 312. When solenoid valve 312 is shut, servo valve 308 controls the position of cylinder 302 based on a command received from a controller 310. This mode provides a very stiff motion of load 316. A compliant mode can be achieved by opening solenoid valve 312 to accumulator 306. In this mode, the gas pressure will be dependent on load 316. The position of cylinder 302 is controlled by servo valve 308 but because of accumulator 306, the load has compliance and can slightly move dependent on the volume and pressure of gas in accumulator 306. Using a similar circuit for hydraulic actuator 130a, a boom can be used as a master boom by shutting solenoid valve 312 or a slave boom by opening solenoid valve 312.

By increasing the number of vehicles to four or more, selecting the master and slave booms may be seen as an optimization problem and may be considered when determining the position of the vehicles. Depending on the defined cost-function, different booms can be selected to be in slave mode where such selection can be switched in different areas of the large workspace as the moving platform or system 100 is in operation.

Figure 16:
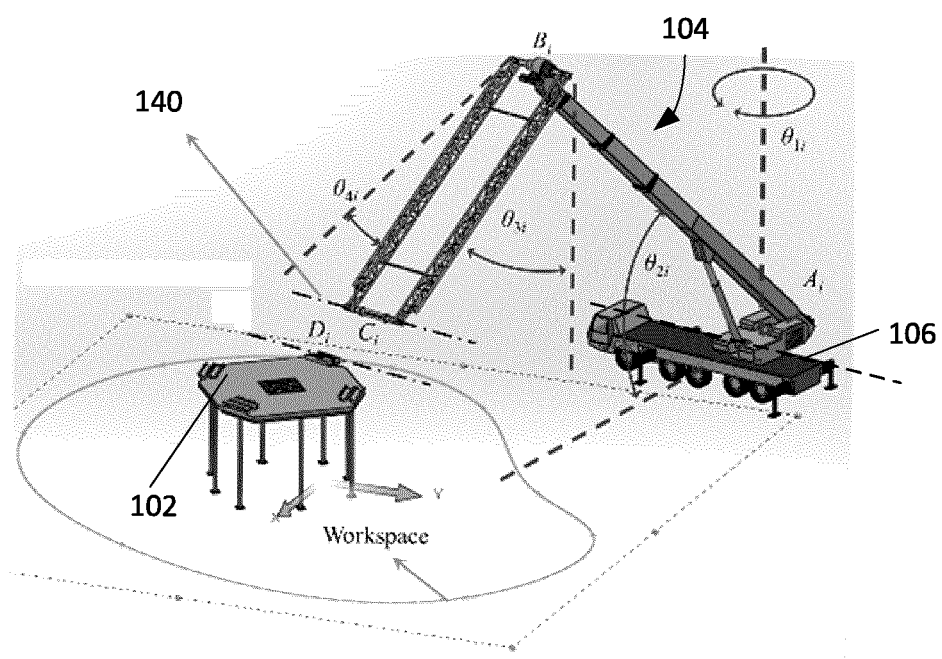
FIG. 16 is a perspective view of geometric parameters and conditions for attaching a boom to a moving platform.
Figure 17:
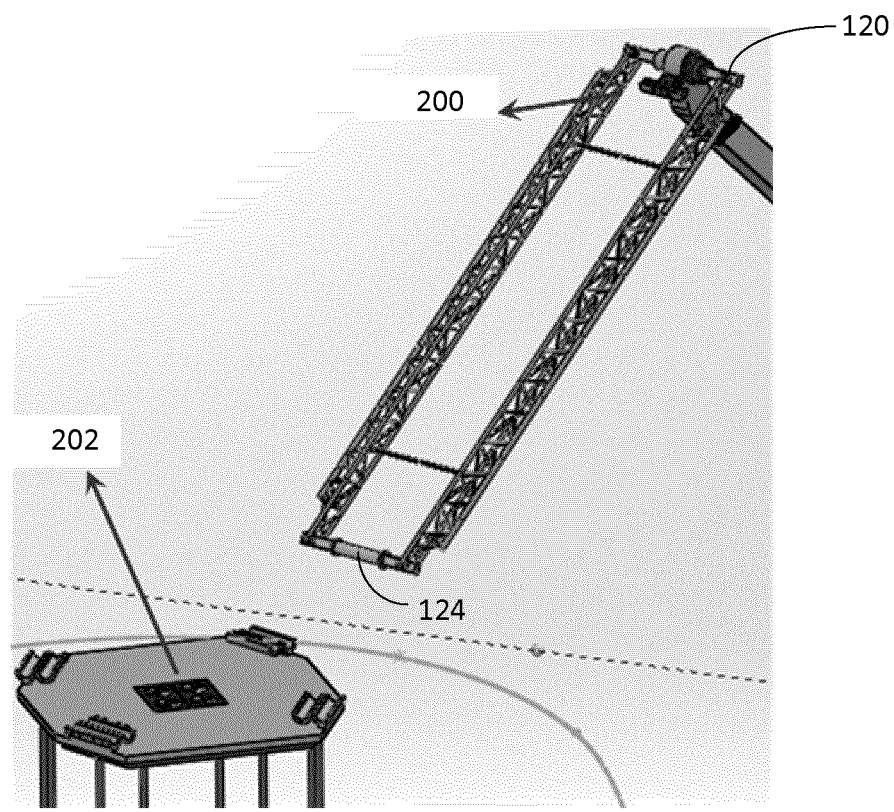
FIG. 17 is a perspective view of a boom and a moving platform.
Figure 18:
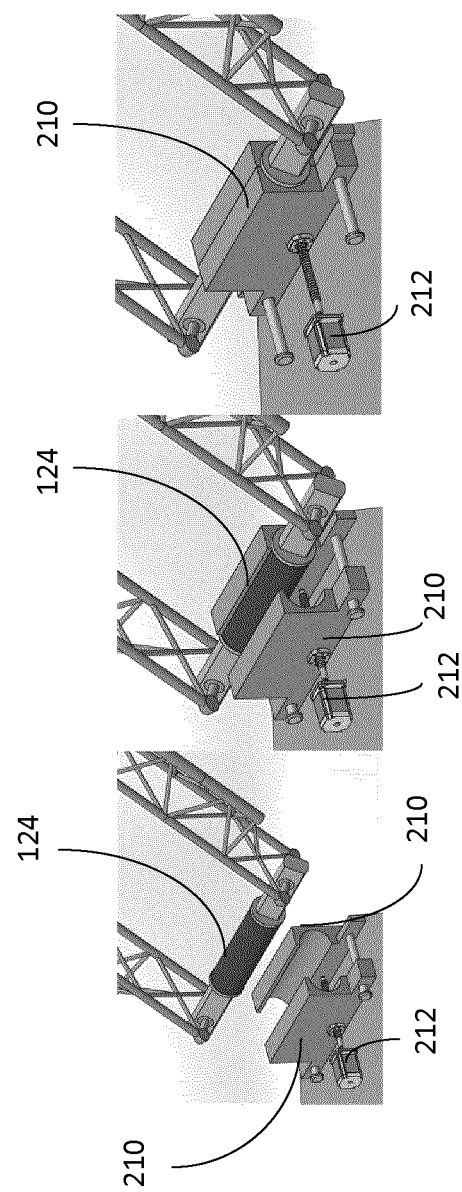
FIG. 18 is a series of views of a first locking mechanism on the moving platform.

Turning to FIGS. 16, 17, and 18, in one embodiment, to connect the boom 104 to the moving platform 102, an axis of the platform shaft portion 124 and an axis of a split revolute joint mechanism 210, (as shown in FIG. 18) for receiving the platform shaft portion 124 on the moving platform 102 are aligned whereby axes $C_i$ and $D_i$ coincide. After placing the shaft portion 124 in the split revolute joint 210 by controlling the arms using actuators 130a to 130b and also telescopic motion (i.e. the telescoping motion of the telescopic arm portion 114), the joint is closed manually or using an actuator 212 around the shaft portion 124. Upon closing and locking the split revolute joint 210, the parallelogram arm 116 is linked to moving platform 102. In a similar manner all other booms are connected to the platform 102

Figure 20A:
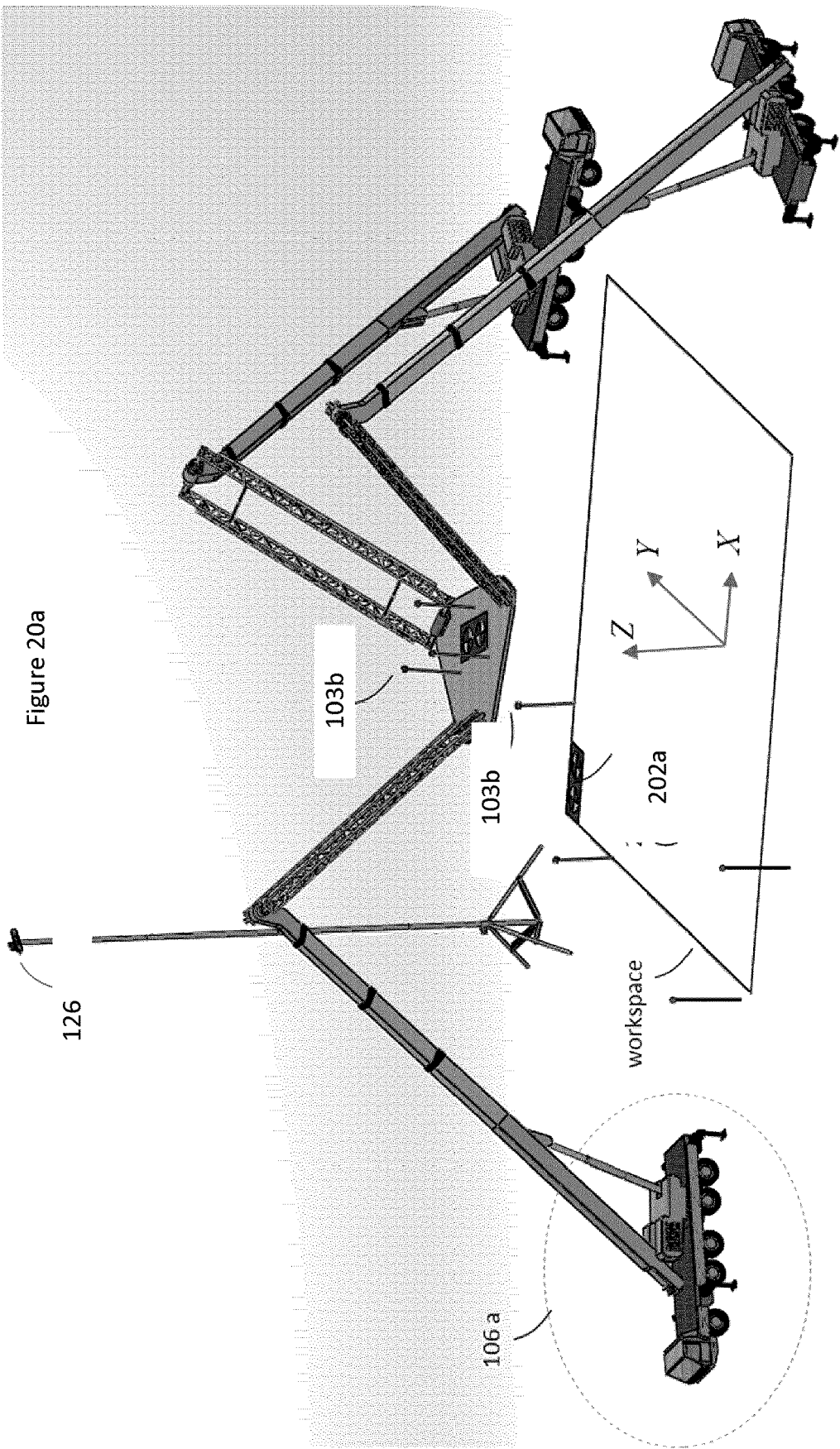
FIGS. 20a and 20b are schematic diagrams of another embodiment of a mobile reconfigurable robot for use in large workspace operations.
Figure 20B:
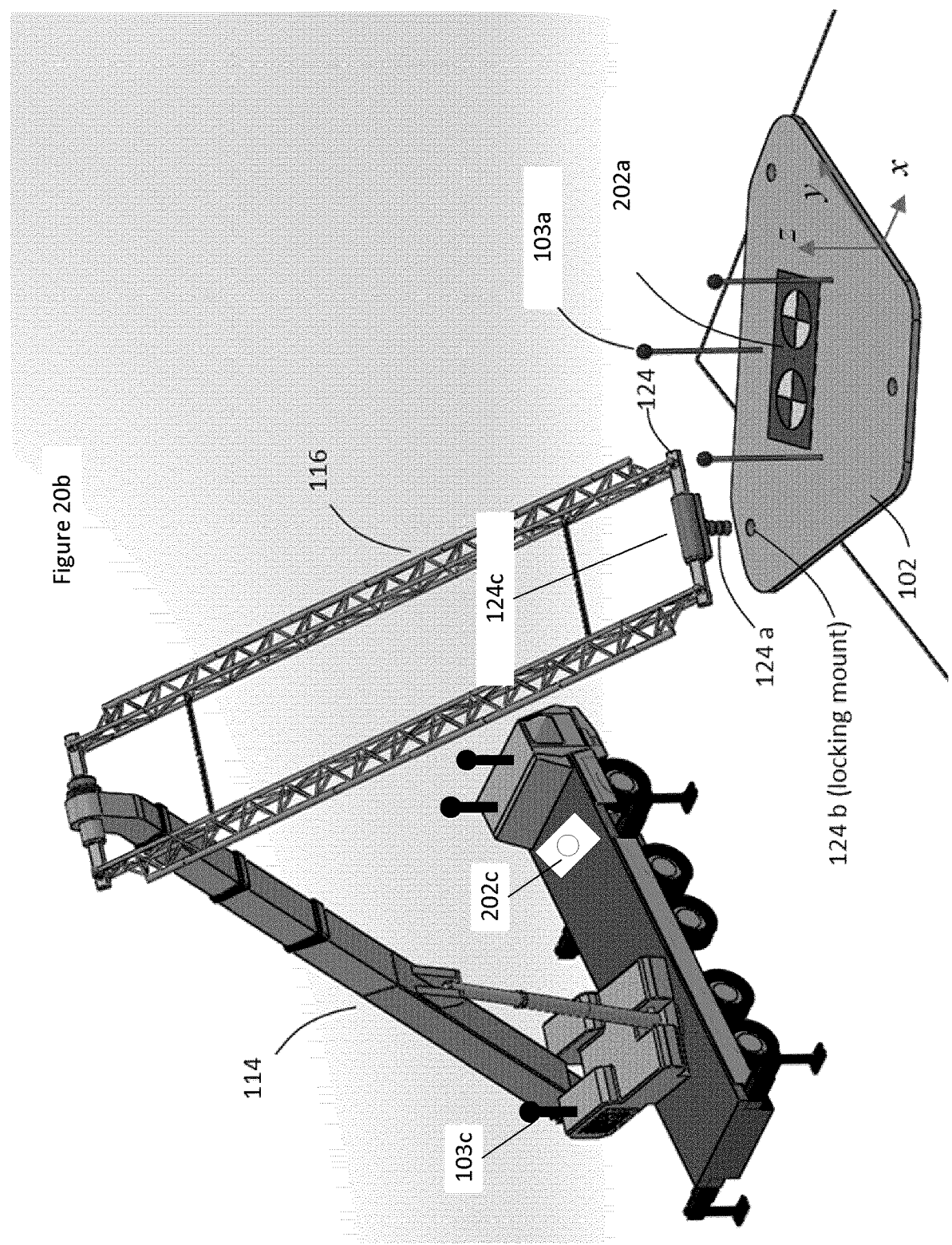

In another embodiment shown in FIG. 20b, the shaft portion 124 includes a revolute joint 124c with a normal shaft portion 124a. The platform 102, has a normal housing (locking mount) 124b to receive shaft portion 124a with a locking mechanism to reduce the likelihood of vertical motion of the revolute joint 124c with respect to platform 102, and a locking mechanism to reduce the likelihood or shaft 124a rotating. After inserting shaft portion 124a in housing 124b, the portion 124a is locked from any vertical motion with respect to platform 102. In a similar manner all other booms are connected to the platform 102.

After connecting all booms to the moving platform, each of the angles $\theta_{1i}$ for the individual booms are locked and the actuators for angles $\theta_{3i}$ and $\theta_{4i}$ of the booms are held in a passive mode (free to move). To move the platform 102, as discussed above, different combinations of the booms' actuators, $\theta_{1i}$, $\theta_{2i}$ and telescopic motion (i.e. the telescoping motion of the telescopic arm portion 114), can be used. For the connection embodiment shown in FIG. 18 where no rotation of 210 with respect to platform 102 is allowed, $\theta_{1i}$ of all booms need to be locked and only the actuators controlling $\theta_{2i}$ and telescopic motion can be used for controlling the moving platform.

For the connection embodiment shown in FIG. 20b, the actuators controlling $\theta_{1i}$ can be used in addition to $\theta_{2i}$ and telescopic motion (i.e. the telescoping motion of the telescopic arm portion 114) for controlling the moving platform 102. The actuator controlling $\theta_{1i}$ of each boom can be used or activated, when portion 124a is unlocked and is free to rotate along axis 124b while it is locked from any vertical motion with respect to the platform 102. While different methods to control the robot system are contemplated, in one approach, the determinations are based on the speed of actuators, workspace, optimizing for the robot load capacity or stiffness, and other considerations.

Figure 19:
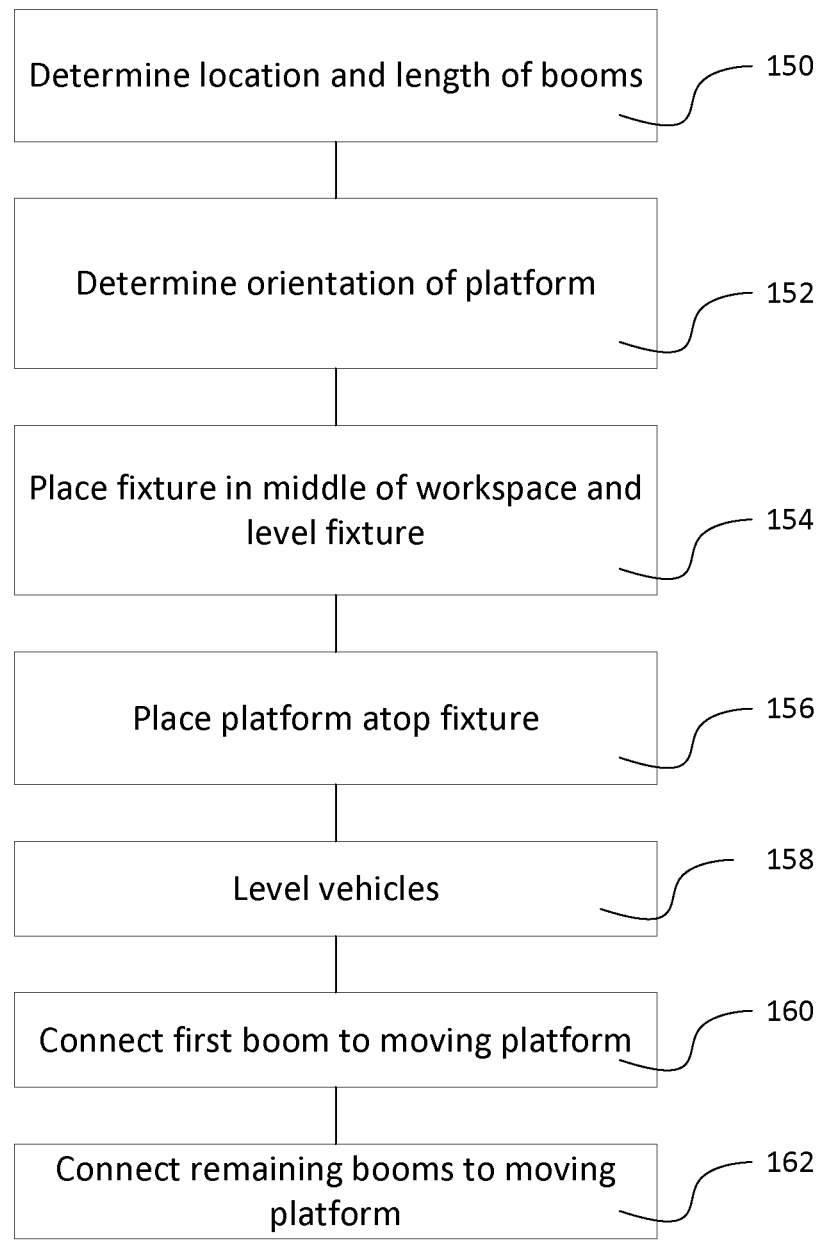
FIG. 19 is a flowchart outlining a method of calibrating a robotic system.

Turning to FIG. 19, a method of system initiation is shown. Initially, based on the workspace and the area surrounding the workspace, a location for the base fixtures and length of the telescopic booms are determined (150). While there may be different workable solutions, in one embodiment, a preferred position for each of the base fixtures, such as vehicles or portable stands, and booms is determined. This preferred position for each of the base fixtures is preferably based on the workspace and available space for the base fixtures. In addition, an orientation of the moving platform with respect to the large workspace is determined (152). A fixture that can hold the moving platform and can be leveled is placed somewhere in middle of the workspace (154) and leveled. The moving platform can then be placed atop the fixture (156) such as by a crane with the orientation determined earlier. This is schematically shown in FIG. 6.

The vehicles are then levelled with respect to a horizontal plane in their selected positions (158). This may be done with the outriggers 112 as disclosed above. A first boom is then connected to the moving platform (160). This can be done manually using actuators 130*a* to 130*d* and the telescopic actuator within the telescoping arm portion. The other remaining booms are then connected to the moving platform (162).

In order to operate the robot after connecting all the booms to the moving platform 102, the system is preferably calibrated and its inverse kinematics identified. This requires a measurement system to determine the position and orientation of Ai of the base fixtures and moving platform 102 (FIG. 16) with respect to the ground coordinates. Different techniques can be used for such measurements including, but not limited to, vision systems, laser measurements, structured-light scanning, etc. An example of such a measurement system is shown in FIG. 20*a* in which some light-emitting diodes LEDs 103*b*, and/or markers 202*a* are mounted on the moving platform, workspace, and vehicles. The position of LEDs and/or markers on the ground, are known with respect to the ground coordinates XYZ and the position of LEDs and/or markers on the vehicle and moving platform are known with respect to the vehicle and moving platform coordinates, respectively. The measurement system may further include at least one camera 126 mounted preferably on a post close to the workspace or on the trucks that can see the LEDs/markers on the platform (103*a*, 202*a*), workspace (103*b*, 202*a*) and vehicles (103*c*, 202*c*). When the camera(s) sees the LEDs/markers on the ground, the camera(s) coordinates with respect to the ground coordinates are identified. Consequently, the position of LEDs and/or markers on the moving platform and vehicles are known with respect to the camera coordinate and hence the ground coordinates. Since the locations of the LEDs/markers on the moving platform and vehicles are known with respect to the moving platform and vehicles coordinates, the position/orientation of the moving platform and vehicles (Ai) will be found with respect to the ground coordinates.

As mentioned, other methods and sensory systems or other number of cameras and arrangements can be used for the measurement of the vehicles Ai and moving platform with respect to the ground coordinates. By measuring location and orientation of Ai and the moving platform with respect to the ground coordinates and using the sensors in the arms 104 to measure the $\theta_{1i}$, $\theta_{2i}$ and the telescopic length (or length of the telescope arm portion 114) and hence $l_{2i}$, the forward and inverse kinematics of the robot are identified using the geometry between the arms and the moving platform.

Upon identifying the inverse kinematics of the robot, the moving platform can be moved from any point in its workspace to any other point using actuators 130*a*, 130*b*, and the actuator in the telescopic arm portion 114 in each of the two-arm systems 104. Actuators 130*b* can be used when the parallelogram arm portion is free to rotate on an axis normal to the moving platform 102 while it is connected to the moving platform. When actuator 130*b* is not used and locked, the parallelogram arm portion should also be locked from rotating along a normal axis to the moving platform.

As discussed earlier, the moving platform has three DOFs and therefore, for the system shown in FIG. 8, three of the nine available actuators are needed to operate the system and the rest of actuators are dependent or locked. Different combinations of these actuators can be used to reach different parts of the workspace, or increase the load capacity, or rigidity of the system. Therefore, in FIG. 8, six (6) actuators are locked and three (3) are used to control the robot.

To move the moving platform from one known point to another known point, the identified inverse kinematics is used to map the new (or desired) position of the moving platform with respect to the new position of arms 114 to move the moving platform to the desired position considering the selected combination of the actuators for robot operation. The new positions of the 3 actuators may be sent to a single controller controlling all the actuators or may be sent to a set of controllers whereby a single controller controls a single actuator. These controllers monitor the position of actuators to make sure they reach to the new position. In addition to the actuators' controller, the system may include a robot controller that uses the robot inverse kinematics and other information including the positions of the actuators, the user desired path of the robot, safety measures, and others to control the motion of the moving platform. To improve further the positional accuracy of the moving platform, the robot controller may also use the position of the moving platform measured from the measurement system discussed earlier for the calibration and initialization of the robot. This independent measurement of the moving platform can be used to reduce or eliminate any error the robot sensors and any backlash the robot joints.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A mobile reconfigurable robot for use in a large workspace comprising:
   a mobile platform;
   a set of base fixtures; and
   a set of two-arm booms, each of the set of two-arm booms mounted at one end to one of the set of base fixtures and at a second end to the mobile platform;
   wherein each of the set of two-arm booms includes:
      a main arm portion; and
      a parallelogram arm portion connected to the main arm portion via a horizontal revolute joint.

2. The mobile configurable robot of claim 1 wherein the parallelogram arm portion comprises:
   a pair of arms portions in a parallel relationship with each other.

3. The mobile configurable robot of claim 1 wherein each of the set of two-arm booms are connected to the mobile platform via a locking mechanism.

4. The mobile configurable robot of claim 3 wherein the locking mechanism comprises:
   a split revolute joint mechanism.

5. The mobile configurable robot of claim 4 wherein the locking mechanism further comprises:
   an actuator for controlling the split revolute joint mechanism.

6. The mobile configurable robot of claim 1 wherein each of the set of two-arm booms is connected to one of the set of base fixtures via a boom/fixture revolute joint.

7. The mobile configurable robot of claim 6 wherein each of the set of two-arm booms further comprises a set of actuators.

8. The mobile configurable robot of claim 7 wherein each of the set of actuators comprises:
   a first actuator for controlling rotational movement of the two-arm boom with respect to the base fixture;
   a second actuator for controlling the boom/fixture revolute joint to be at a boom/fixture angle $\theta_2$, where the boom/fixture angle is an angle with respect to the main arm portion and the base fixture;
   a third actuator for controlling a parallelogram arm/telescopic arm boom angle $\theta_3$, where the parallelogram arm/telescopic arm boom angle is an angle with respect to the parallelogram arm portion and the main arm portion of the boom; and
   a fourth actuator for controlling a platform/boom angle revolute joint to control a platform/boom angle $\theta_4$, where the platform/boom angle is an angle with respect to the parallelogram arm portion and the telescopic arm portion of the boom.

9. The mobile configurable of claim 8 wherein at least one of the set of actuators is a hydraulic cylinder.

10. The mobile configurable robot of claim 8 further comprising at least one controller for controlling the set of actuators.

11. The mobile configurable robot of claim 1 wherein the set of base fixtures comprises a portable stand, a vehicle, a pillar or a stationary tower.

12. The mobile configurable robot of claim 1 wherein the main arm portion comprises:
   a telescopic arm portion; and
   a fixed arm portion.

13. A method of providing a robotic apparatus for use in a large workspace comprising:
   placing a set of base fixtures around a perimeter of the large workspace;
   connecting a first end of a two-arm boom to each of the set of base fixtures; and
   connecting a second end of the two-arm boom to a moving platform within the large workspace;
   wherein each of the two-arm booms includes:
      a main arm portion; and
      a parallelogram arm portion connected to the main arm portion via a horizontal revolute joint.

14. The method of claim 13 wherein connecting the second end of the two-arm boom to the moving platform comprises:
   determining a location of the moving platform within the large workspace;
   determining a location of each of the set of base fixtures; and
   controlling a set of actuators associated with each two-arm boom based on the location of the moving platform and the location of each of the set of base fixtures.

15. The method of claim 14 wherein controlling the set of actuators comprises:
   controlling rotational movement of the two-arm boom with respect to the base fixture;
   controlling a boom/vehicle angle $\theta_2$, where the boom/vehicle angle is an angle with respect to a telescopic arm portion of the two-arm boom and the base fixture;
   controlling a parallelogram arm/telescopic arm boom angle $\theta_3$, where the parallelogram arm/telescopic arm boom angle is an angle with respect to a parallelogram arm portion of the two-arm boom and the telescopic arm portion; and
   controlling a platform/boom angle $\theta_4$, where the platform/boom angle is an angle with respect to the parallelogram arm portion and the telescopic arm portion of the boom.

16. The method of claim 14 further comprising:
   controlling a locking mechanism to lock the moving platform and the two-arm boom together.

17. The method of claim 13 further comprising calibrating the robotic apparatus.

18. The method of claim 13 further comprising determining inverse kinematics of the robotic apparatus.

* * * * *